Oct. 29, 1946.  V. CRONSTEDT  2,410,340
TURBINE SEAL
Filed May 11, 1943
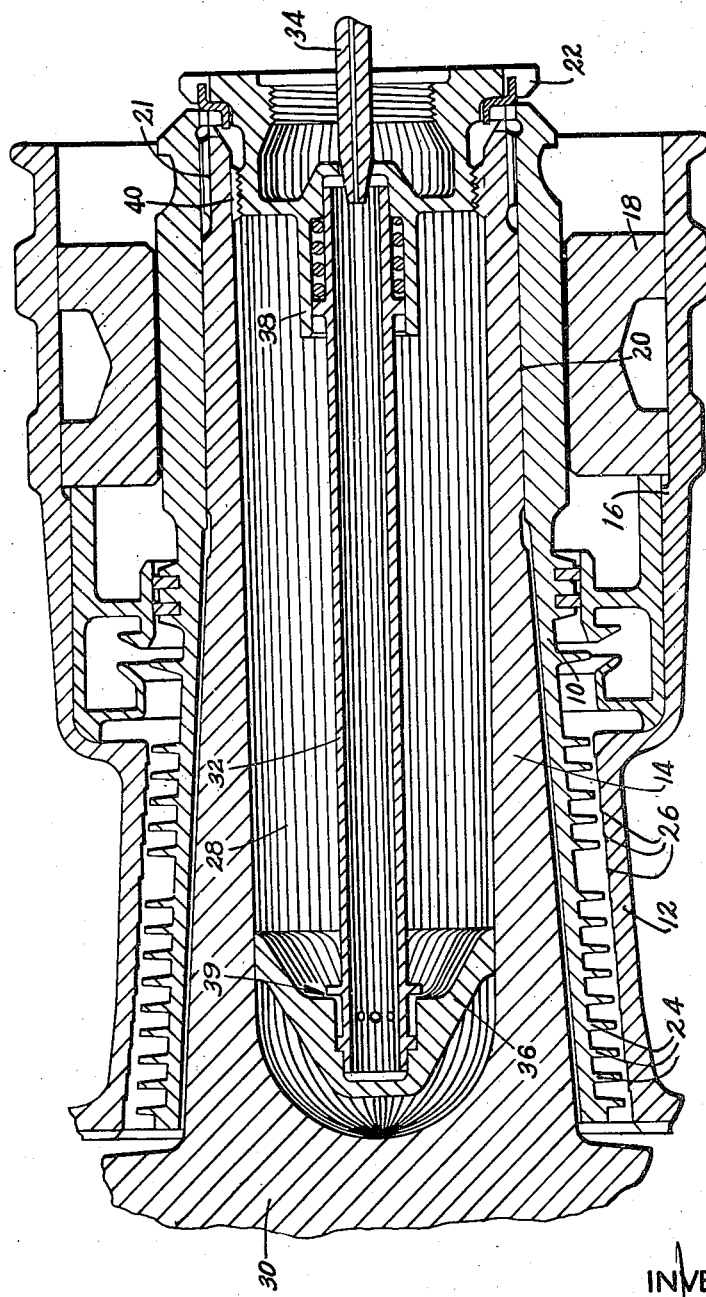
INVENTOR
V. Cronstedt
Charles A. Warren
ATTORNEY Patented Oct. 29, 1946

2,410,340

UNITED STATES PATENT OFFICE 2,410,340

TURBINE SEAL

Val Cronstedt, Marlboro, Conn., assignor to United Aircraft Corporation, East Hartford, Conn., a corporation of Delaware Application May 11, 1943, Serial No. 486,618

2 Claims. (Cl. 308—36.1)

This invention relates to a labyrinth seal for a turbine.

If the inner element of the labyrinth seal is mounted directly on the turbine shaft, the element is misaligned with the stationary outer seal element by the resonant bending of the shaft. A feature of this invention is the mounting of the inner seal element to minimize the effect of shaft bending on the seal.

When a turbine is driven by hot fluids, the turbine rotor is heated nearly to the temperature of the gases. Part of this heat is radiated by the elements of the labyrinth seals mounted directly on the shaft, and the heat frequently results in injury to the seal. An object of this invention is to mount the seal in such a way as to minimize the amount of heat transferred to the seal.

To minimize space requirements, it is advantageous to have the seal located as close as possible to the power section of the turbine. The turbine rotor is heated at this point, and the seals, if so located, may therefore be damaged by the heat. To overcome this, the invention involves placing the seals as close to the power section as possible but with the rotating part of the seal supported by the shaft as far as possible from the power section.

In turbines driven by hot gases, coolant is sometimes circulated through the part of the rotor adjacent the rotor bearings. A feature of this invention is the mounting of the rotating element of the labyrinth seal adjacent the cooled part of the turbine rotor for reducing the heat transfer to the seal.

Another feature of the invention is a rotating element of a labyrinth seal which is integral with a bearing sleeve on the turbine shaft. This is advantageous when the turbine shaft is not a good bearing material.

Other objects and advantages will be apparent from the specification and claims, and from the accompanying drawing which illustrates one example of a structure embodying the invention.

The single figure is a sectional view through the labyrinth seal and turbine shaft and one shaft bearing.

The seal includes an inner sleeve 10 and an outer sleeve-like element 12. Sleeve 10 is mounted on the turbine shaft 14 and member 12 forms a part of the bearing support 16 that carries a bearing 18 for one end of the shaft. At its outer end sleeve 10 has a bore 20 fitting the outer end of shaft 14 and is held in place on the shaft by splines 21 and a threaded nut 22 engaging the outer end of the sleeve.

The inner end of the sleeve 10 has several spaced annular sealing fins 24 which cooperate with correspondingly spaced stepped shoulders 26 on member 12. The arrangement of the stepped shoulders 26 and the decreasing diameter of the successive fins 24 makes possible endwise assembly of the bearing support and the turbine shaft.

Sleeve 10 is spaced from the shaft throughout the part of the sleeve on which the fins are located, the only contact between sleeve and shaft being the contacting surface 20. Bearing 18 engages the outer surface of sleeve 10 concentric with surface 20. Shaft 14 may bend within sleeve 10 without affecting the sleeve.

Shaft 14 has a recess 28 extending from the end of the shaft to a point adjacent the power section 30 of the rotor with which shaft 14 is integral. Coolant is circulated through this recess and cools the part of the shaft that supports sleeve 10. Coolant enters recess 28 through a tube 32 into which coolant is admitted by a nozzle 34. At its inner end, tube 32 is supported by a baffle plate 36 in recess 28, and at its outer end by a ring 38 integral with nut 22. Coolant enters the recess from tube 32 through a slot 39 and escapes through one or more grooves 40.

Sleeve 10 forming the inner sealing element is thus supported at its end on the cool part of the rotor shaft. The sealing fins 24 are carried by the part of the sleeve remote from its point of support. Transfer of heat from the shaft to these fins is minimized by the above-described mounting of the sleeve and by the cooling of the shaft at the portion engaged by the sleeve. The spacing of sealing fins 24 from shoulders 26 has been exaggerated in the drawing for the sake of clarity.

It is to be understood that the invention is not limited to the specific embodiment herein illustrated and described, but may be used in other ways without departure from its spirit as defined by the following claims.

I claim:

1. In a turbine, a rotor having a power section and a projecting shaft at one end, a recess in said shaft through which a coolant is directed, a casing in which said shaft is journaled and a sleeve mounted at its outer end only on the portion of the shaft in which the recess is located, said sleeve adjacent to the inner end, and the casing having cooperating sealing elements defining a labyrinth seal, a part of the outer surface of said sleeve forming a bearing surface for the rotor.

2. In a turbine, a rotor having a power section and a projecting shaft at one end, a recess in said shaft through which a coolant is directed, a casing in which said shaft is journaled and a sleeve mounted at its outer end only on the portion of the shaft in which the recess is located, said sleeve adjacent its inner end, and the casing having cooperating sealing elements defining a labyrinth seal, the sealing elements on the sleeve being located adjacent the inner end, a part of the outer surface of said sleeve substantially coextensive with the part of the sleeve which engages the shaft forming a bearing surface for the rotor.

VAL CRONSTEDT.